United States Patent [19]

Nelson

[11] Patent Number: 5,149,546
[45] Date of Patent: Sep. 22, 1992

[54] CHECK VALVE FOR A FLUID-ASSISTED PLASTIC INJECTION MOLDING APPARATUS

[75] Inventor: William A. Nelson, New Baltimore, Mich.

[73] Assignee: Automotive Plastic Technologies, Inc., Sterling Heights, Mich.

[21] Appl. No.: 724,044

[22] Filed: Jul. 1, 1991

[51] Int. Cl.⁵ .............................................. B29C 45/23
[52] U.S. Cl. ................................. 425/130; 264/572; 425/562; 425/563; 425/564
[58] Field of Search .............. 425/130, 562, 563, 564; 264/572

[56] References Cited

U.S. PATENT DOCUMENTS

| | | | |
|---|---|---|---|
| 4,171,941 | 10/1979 | Yotsutsuji et al. | 425/563 |
| 4,740,150 | 4/1988 | Sayer | 264/513 |
| 4,855,094 | 8/1989 | Hendry | 425/562 |
| 4,905,901 | 3/1990 | Johnson | 264/135 |
| 4,942,006 | 7/1990 | Loren | 425/557 |

*Primary Examiner*—Tim Heitbrink
*Attorney, Agent, or Firm*—Dykema Gossett

[57] ABSTRACT

A check valve is provided that is especially useful in gas-assisted injection molding wherein pressurized gas is injected into molten plastic material. A tapered or cone-shaped valve member which seats into a correspondingly tapered or cone-shaped valve chamber provides the mechanism by which the valve seals against reverse flow. Any plastic material entering the gas passageway would contact the base end of the tapered or cone-shaped valve member and not any sealing surfaces. By minimizing contact with the sealing surfaces, the useful lifetime of the check valve is significantly increased.

24 Claims, 2 Drawing Sheets

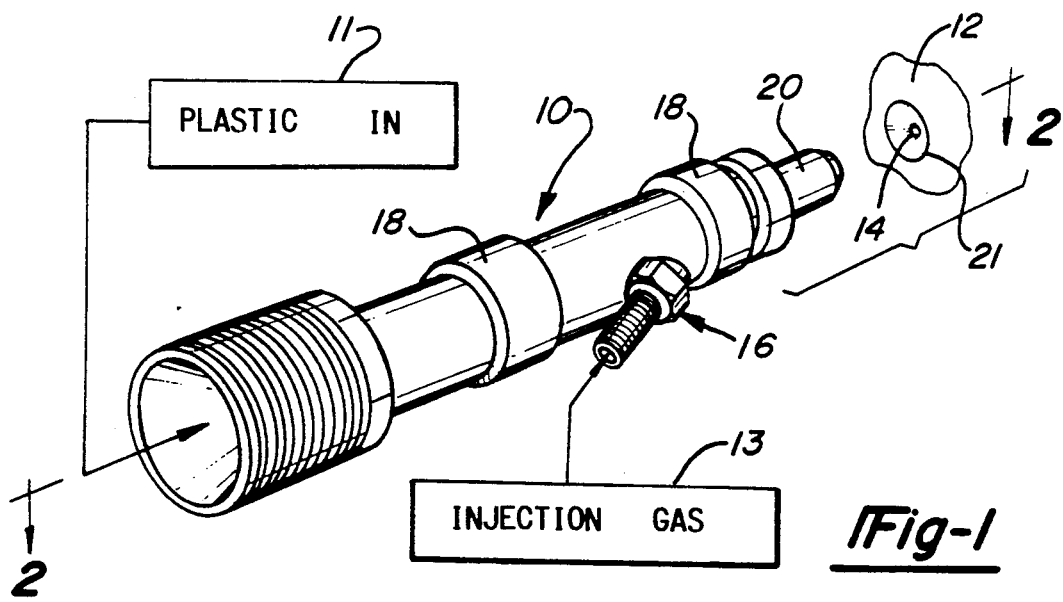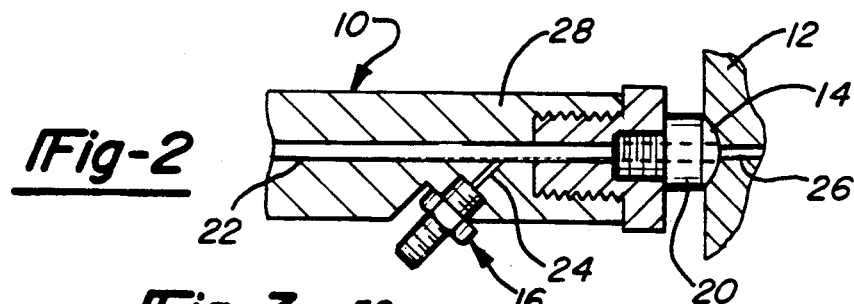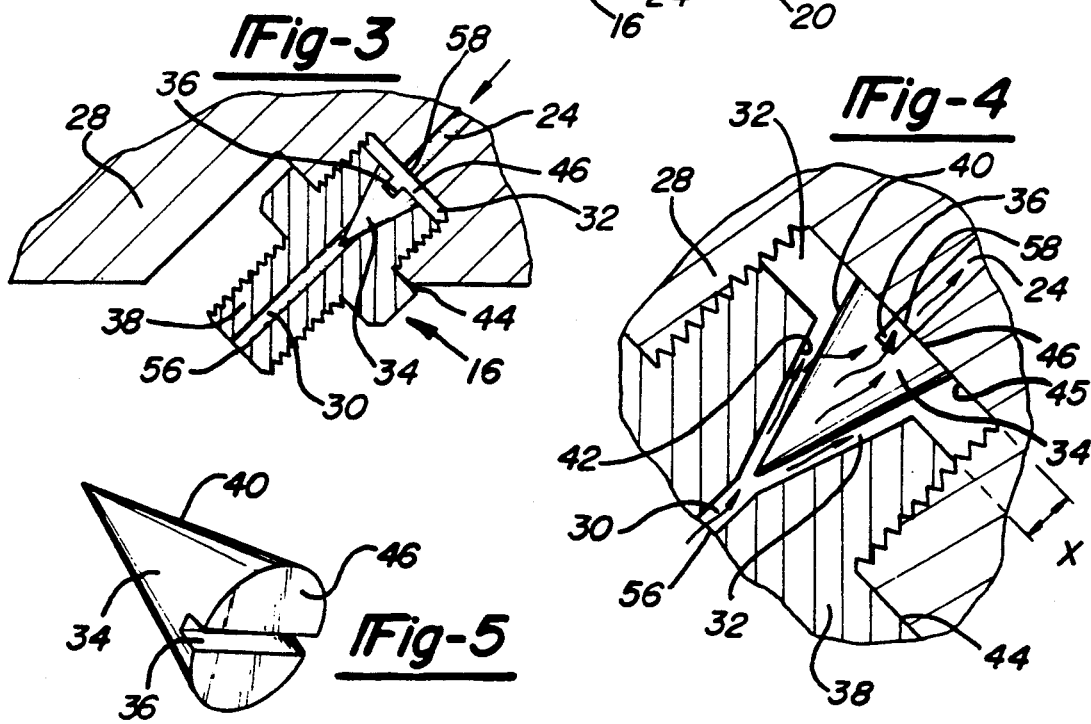

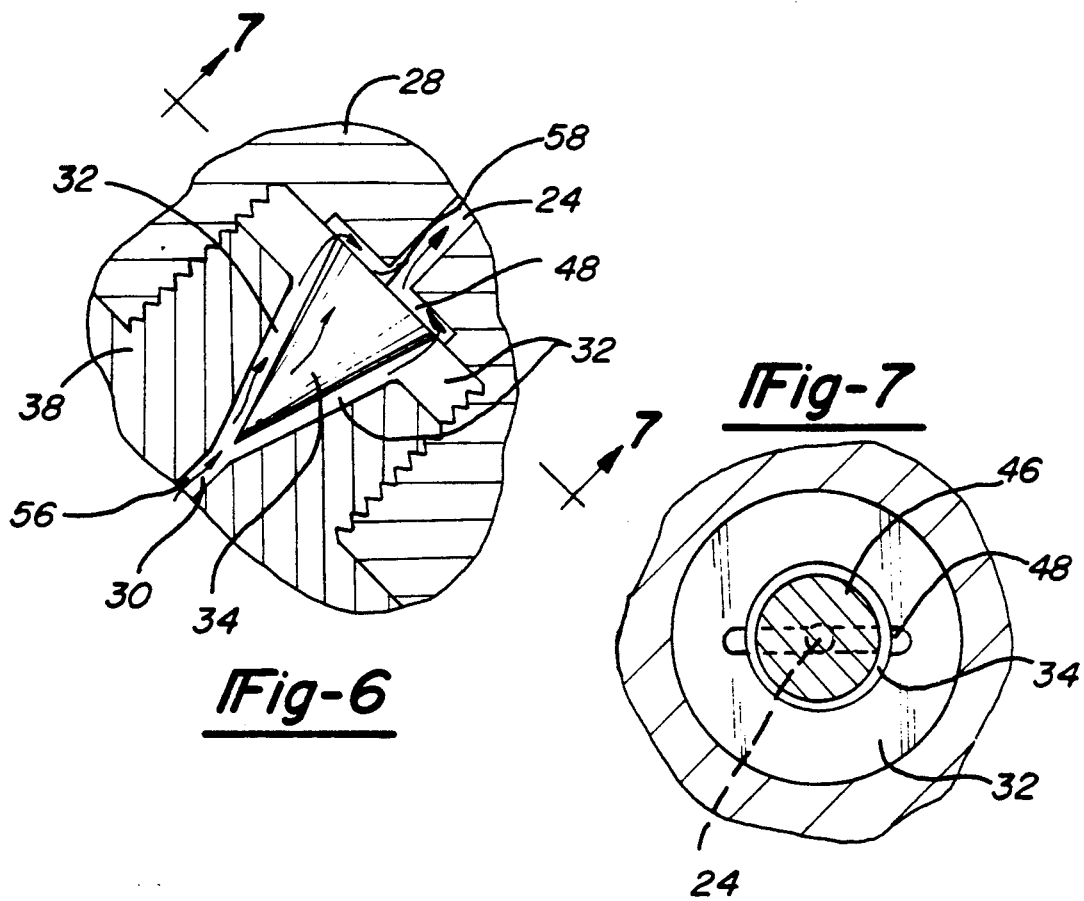
*Fig-6*
*Fig-7*
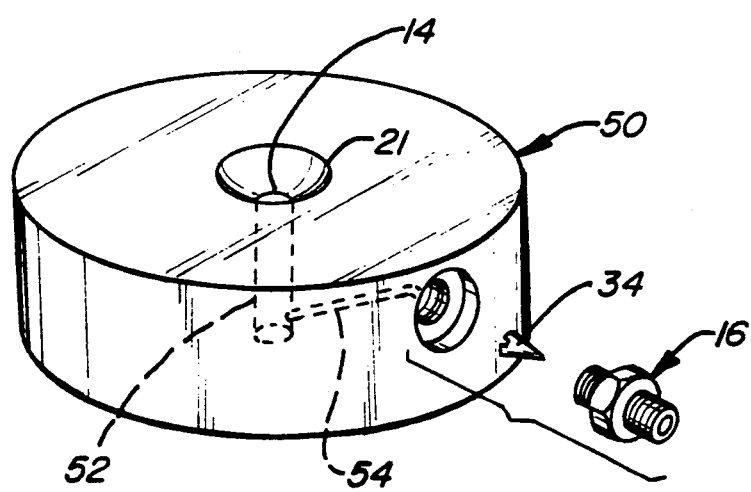
*Fig-8*

CHECK VALVE FOR A FLUID-ASSISTED PLASTIC INJECTION MOLDING APPARATUS

FIELD OF THE INVENTION

This invention relates to an improved check valve which allows passage of a fluid or gas in one direction only. This check valve is particularly useful in fluid- or gas-assisted injection molding wherein the check valve allows fluid or gas to be injected into a molten plastic flow path while preventing or minimizing the back flow of molten plastic into the fluid or gas supply system or lines.

BACKGROUND OF THE INVENTION

In gas-assisted injection molding, a pressurized gas is injected into a molten thermoplastic stream. One of the problems associated with such a system is back flow of the molten thermoplastic into the pressurized gas supply lines. The thermoplastic can harden in the pressurized gas supply lines thereby restricting gas flow and, ultimately, blocking gas flow. Several methods or approaches have been advanced to overcome this problem.

For example, in U.S. Pat. No. 4,905,901, a complicated baffle design was incorporated into the gas flow path to retard the flow of plastic into the gas flow path. The baffle was intended to provide a small diameter, tortuous passage through which the gas could easily flow but through which the viscous molten thermoplastic could flow only with great difficulty. And in U.S. Pat. No. 4,855,094, an attempt was made to solve this same problem by providing gas passages of sufficiently small diameter to resist entry of the molten thermoplastic. Gas passages of 0.005 to 0.040 inches were said to be effective to preventing entry of the molten thermoplastic material. Both of these approaches have been less successful than desired. Although such approaches may, in fact, restrict the entry of the thermoplastic into the gas passageways, they do not prevent such entry. Over time, the gas passages still become restricted and, ultimately, blocked. In some instances, it is necessary to clean out the gas passages every few hours.

Check valves with ball-shaped valve members have also been used in gas-assisted injection molding applications. For example, in U.S. Pat. No. 4,942,006, a ball check valve is provided in an injection nozzle. The actual valve is located within the gas passageway. When the valve is in the closed position, molten plastic entering the gas passageway can contact and coat at least a portion of the ball member. As the ball valve repeatedly moves from its open to closed positions, the ball may rotate. Portions of the ball which have contacted plastic material in earlier cycles may, in later cycles, act as the sealing surface. In such cases, plastic material on the sealing surfaces will prevent the valve from sealing. This failure to seal will allow even more plastic material to enter the gas passageway and contact the ball in later injection cycles, thus accelerating the problem. Ball valves of the type used in the prior art have, therefore, a limited useful lifetime and require frequent cleaning. In some instances, it may be necessary to clean such check valves every few operational hours. Such cleaning requires dismantling of the nozzle itself, which, depending on the nozzle design, can be very involved and time consuming.

It is, therefore, desirable to provide a method by which plastic material can be prevented, or at least minimized, from entering gas passageways in gas-assisted injection molding. The check valves of the present invention provide significantly improved performance over the methods currently in use to prevent plastic material from entering and clogging gas passageways in a gas-assisted injection molding apparatus. This improvement is accomplished by providing a check valve wherein the sealing surfaces are not in direct contact with the plastic material. When cleaning is necessary, the check valves of the present invention can be disassembled and cleaned quite easily. These check valves can also be used in other applications and environments.

SUMMARY OF THE INVENTION

In accordance with this invention, an improved check valve is provided. This check valve is particularly useful and adapted for fluid- or gas-assisted injection molding wherein the check valve allows fluid or gas to be injected into a molten plastic flow path while preventing or minimizing the back flow of molten plastic into the fluid supply system or lines. The design of the check valve of the present invention allows for a large sealing surface area. And, when used in an injection molding machine, the contact of the molten plastic with the sealing surfaces is prevented or, at least, minimized. Therefore, by preventing or minimizing such contact, the check valves of the present invention are less likely, as compared to prior art check valves, to fail to seal due to plastic adhering to the sealing surfaces.

One object of the present invention is to provide a check valve adapted for passage of a fluid from an upstream to a downstream direction, said check valve comprising (a) a valve body with an upstream end in fluid communication with a fluid supply line and a downstream end in fluid communication with a fluid delivery line, the valve body including
 (1) a bore extending through the valve body in fluid communication with the upstream end and the downstream end, and
 (2) a valve chamber provided in the bore and in fluid communication with the bore wherein the valve chamber is tapered such that the small diameter of the valve chamber is adjacent to the upstream end of the valve body, the large diameter of the valve chamber is adjacent to the downstream end of the bore, and the large diameter of the valve chamber is larger than the bore diameter; and (b) a tapered valve member adapted to fit within the valve chamber and movable therein between a closed position and an open position, wherein
 (1) when the tapered valve member is in the closed position, the tapered surfaces of the valve member are sufficiently engaged with the tapered surfaces of the valve chamber to prevent fluid from passing from the downstream end to the upstream end of the bore, and
 (2) when the tapered valve member is in the opened position, the tapered surfaces of the valve member are displaced from the tapered surfaces of the valve chamber whereby fluid can pass from the upstream end to the downstream end of the bore.

Another object of the present invention is to provide a nozzle for use in a fluid-assisted plastic injection molding apparatus, said nozzle including (a) a nozzle body having an upstream end for fluid communication with an end of an associated plastic injection molding machine and a downstream end for fluid communication with a sprue of an associated mold body, said nozzle body including
   (1) an axially extending bore for establishing a plastic flow path,
   (2) a second bore extending through, and non-axially to, the nozzle body where the first end of the second bore is in fluid communication with a fluid supply and the second end of the second bore is in fluid communication with, and intersects, the axially extending bore, and
   (3) a valve chamber provided in the second bore and in fluid communication with the second bore wherein the valve chamber is tapered such that the small diameter of the valve chamber is adjacent to the first end of the second bore, the large diameter of the valve chamber is adjacent to the second end of the second bore, and the large diameter of the valve chamber is larger than the second bore diameter; and
(b) a tapered valve member adapted to fit within the valve chamber and movable therein between a closed position and an open position, wherein
   (1) when the tapered valve member is in the closed position, the tapered surfaces of the valve member are sufficiently engaged with the tapered surfaces of the valve chamber to prevent fluid from passing from the second end of the second bore to the first end of the second bore, and
   (2) when the tapered valve member is in the opened position, the tapered surfaces of the valve member are displaced from the tapered surfaces of the valve chamber whereby fluid can pass from the first end of the second bore to the second end of the second bore.

Another object is to provide a substantially disk-shaped body adapted for insertion between a molten thermoplastic injection nozzle and a mold body in a fluid-assisted plastic injection molding apparatus, said disk-shaped body including
(a) a thermoplastic passageway extending through the disk-shaped body wherein the thermoplastic passageway has an upstream end for communication with the end of the injection molding nozzle and a downstream end for fluid communication with a sprue of the mold body;
(b) a second passageway extending through the disk-shaped body where the first end of the second passageway is in fluid communication with a fluid supply and the second end of the second passageway is in fluid communication with, and intersects, the thermoplastic passageway, and
(c) a valve chamber provided in the second passageway and in fluid communication with the second passageway wherein the valve chamber is tapered such that the small diameter of the valve chamber is adjacent to the first end of the second passageway, the large diameter of the valve chamber is adjacent to the second end of the second passageway, and the large diameter of the valve chamber is larger than the second passageway diameter; and
(d) a tapered valve member adapted to fit within the valve chamber and movable therein between a closed position and an open position, wherein
   (1) when the tapered valve member is in the closed position, the tapered surfaces of the valve member are sufficiently engaged with the tapered surfaces of the valve chamber to prevent fluid from passing from the second end of the second passageway to the first end of the second passageway, and
   (2) when the tapered valve member is in the opened position, the tapered surfaces of the valve member are displaced from the tapered surfaces of the valve chamber whereby fluid can pass from the first end of the second passageway to the second end of the second passageway.

Still another object of the present invention is to provide an apparatus for molding a plastic part, said apparatus including
(a) a source of molten thermoplastic material;
(b) a source of injection fluid;
(c) a mold body for receiving the molten thermoplastic material from the molten thermoplastic material source, where the mold body contains a sprue;
(d) an injection nozzle secured between the source of thermoplastic material and the mold body, where the injection nozzle includes
   (1) a nozzle body having an upstream end for fluid communication with the source of thermoplastic material and a downstream end for fluid communication with the sprue of the mold body, said nozzle body including
      (A) an axially extending bore for establishing a thermoplastic flow path,
      (B) a second bore extending through, and non-axially to, the nozzle body where the first end of the second bore is in fluid communication with a fluid supply and the second end of the second bore is in fluid communication with, and intersects, the axially extending bore, and
      (C) a valve chamber provided in the second bore and in fluid communication with the second bore wherein the valve chamber is tapered such that the small diameter of the valve chamber is adjacent to the first end of the second bore, the large diameter of the valve chamber is adjacent to the second end of the second bore, and the large diameter of the valve chamber is larger than the second bore diameter; and
   (2) a tapered valve member adapted to fit within the valve chamber and movable therein between a closed position and an open position, wherein
      (A) when the tapered valve member is in the closed position, the tapered surfaces of the valve member are sufficiently engaged with the tapered surfaces of the valve chamber to prevent fluid from passing from the second end of the second bore to the first end of the second bore, and
      (B) when the tapered valve member is in the opened position, the tapered surfaces of the valve member are displaced from the tapered surfaces of the valve chamber whereby fluid can pass from the first end of the second bore to the second end of the second bore.

And still another object is to provide an apparatus for molding a plastic part, said apparatus including
(a) a source of molten thermoplastic material;
(b) a source of injection fluid;
(c) a mold body for receiving the molten thermoplastic material from the molten thermoplastic material source, where the mold body contains a sprue;

(d) an injection nozzle in fluid communication with the thermoplastic material source; and (e) a substantially disk-shaped body secured between, and in fluid communication with, the injection nozzle and the sprue, where the disk-shaped body includes (1) a thermoplastic passageway extending through the disk-shaped body wherein the thermoplastic passageway has an upstream end for communication with the end of the injection nozzle and a downstream end for fluid communication with the sprue of the mold body;

(2) a second passageway extending through the disk-shaped body where the first end of the second passageway is in fluid communication with the fluid source and the second end of the second passageway is in fluid communication with, and intersects, the thermoplastic passageway, and (3) a valve chamber provided in the second passageway and in fluid communication with the second passageway wherein the valve chamber is tapered such that the small diameter of the valve chamber is adjacent to the first end of the second passageway, the large diameter of the valve chamber is adjacent to the second end of the second passageway, and the large diameter of the valve chamber is larger than the second passageway diameter; and (4) a tapered valve member adapted to fit within the valve chamber and movable therein between a closed position and an open position, wherein (A) when the tapered valve member is in the closed position, the tapered surfaces of the valve member are sufficiently engaged with the tapered surfaces of the valve chamber to prevent fluid from passing from the second end of the second passageway to the first end of the second passageway, and (B) when the tapered valve member is in the opened position, the tapered surfaces of the valve member are displaced from the tapered surfaces of the valve chamber whereby fluid can pass from the first end of the second passageway to the second end of the second passageway.

These and other objects and advantages of the present invention will become apparent through the following description of the preferred embodiments of the invention and with reference to the drawings provided.

BRIEF DESCRIPTION OF THE DRAWINGS

FIG. 1 is a perspective view of an injection nozzle equipped with the check value of the present invention.

FIG. 2 is a partial sectional view of the injection nozzle of FIG. 1 taken along section line 2—2.

FIg. 3 is an enlarged sectional view of the check valve of FIG. 2. This shows the check valve in the closed position wherein gas or plastic back flow in the direction of the arrow is prevented.

FIG. 4 is an another enlarged sectional view of the check valve of FIG. 2. This figure shows the check value in the open position wherein gas or fluid is allowed to flow past the valve member and into the plastic flow path.

FIG. 5 is a perspective view of the valve member of the check valve showing a slot for gas passage on the base surface of the valve member.

FIG. 6 is another enlarged section view of the check valve of the present invention wherein the slot for gas passage is located in the nozzle body. The check valve is shown in the open position. FIG. 7 is a partial sectional view of the check valve of FIG. 6 taken along section line 7—7.

FIG. 8 is an exploded, perspective view of a disk containing the check valve of the present invention. The disk is designed to be placed between an injection molding machine nozzle and a mold body in an injection molding apparatus.

The present invention is not to be limited to the details of construction and arrangement of parts as illustrated in the accompanying drawings as the invention is capable of other embodiments and of being practiced in various ways within the scope of the appended claims. Furthermore, the terminology used in this present specification is for the purpose of description and not of limitation.

DESCRIPTION OF THE PREFERRED EMBODIMENTS

The present invention generally relates to check valves wherein flow of a fluid or gas is allowed in one direction but is prevented in the reverse direction. The check valves of the present invention can generally be used in fluid or gas lines in a wide array of equipment and environments. The present check valves are, however, especially designed and adapted for use in fluid-assisted or gas-assisted injection molding methods and apparatus. In such injection molding applications, fluid or gas injection can be through an injection nozzle, through the sprue bushing, through the runner, or directly into the article cavity using the check valve of the present invention.

The check valves of the present invention provide a large surface area for sealing. And contact of the actual sealing area or surfaces of the check valve with material attempting to flow backwards through the check valve (i.e., flow in the direction not allowed) is prevented or, at least, minimized. This feature is especially important in injection molding operations wherein a fluid or gas is injected into a molten thermoplastic flow path. In such an environment, the molten plastic has a tendency to flow down the fluid or gas injection lines once the fluid or gas flow has been terminated. Molten plastic reaching the sealing surfaces may coat or solidify on the sealing surfaces and prevent sealing during later injection cycles. Such a failure to seal defeats the purpose of the check valve. The check valves of the present invention, by preventing or at least minimizing contact of molton plastic with the sealing surfaces, overcomes this problem of the prior art. Thus, the check valves of the present invention should have a significantly longer useful lifetime between cleanings to remove plastic material from the sealing surface than the check valves currently in use.

The check valves of the present invention have essentially one moving part and are essentially self-actuating. In addition, the check valves of the prsesent invention are designed to be removed and disassembled easily for cleaning if they are eventually rendered inoperative due to plastic contacting and adhering to the sealing surfaces. Those skilled in the art will recognize other advantages of the check valves of the present inveniton from the detailed description included herein. Although the following description generally describes the inventive check valves in the environment of an injection molding apparatus, it should be recognized that these check valves can be used in many other systems and apparatus to directionally control the flow of a fluid or gas. For purposes of this specification, the terms "fluid" and "gas" are used interchangeably and the use of one should be considered to include the other.

FIG. 1 shows an injection nozzle 10 for the injection of molton thermoplastic from a source of molten plastic or thermoplastic resin 11 into a mold body 12 and a mold cavity or cavities (not shown) contained within the mold body 12. The nozzle 10, and more specifically the nozzle tip 20, mate with the nozzle mating surface 21 of the mold body 12 such that plastic is injected into the mold cavity or cavities (not shown) via sprue 14. A gas is injected into the molten plastic material from a gas source 13 via the check valve assembly 16. Band heaters 18 assist in keeping the plastic material in a molten state as it passes through the nozzle.

The provisions for the injection of the molten plastic material and the gas within the injection nozzle 10 is shown more clearly in FIG. 2. Molten plastic flows down the plastic flow path 22 towards the nozzle tip 20 and mold body 12. Once plastic reaches the mold body 12, the plastic flows through the sprue 14 and down the sprue flow path 26 to the mold cavity or cavities (not shown). Intersecting the plastic flow path within the nozzle body 28 is the gas flow path 24 through which gas can be injected into the molten plastic. The gas flow path 24 should generally form an acute angle with the plastic flow path 22. This angle is approximately 45° in FIG. 2. With such an acute angle, the gas injected into the plastic flow path 22 is flowing in the same general direction as the plastic, thereby minimizing turbulence in the plastic stream. Generally, this angle is preferably in the range of about 30° to 60°, with an angle of about 45° being most preferred. The diameter of the gas flow path 24 should generally be in the range of about 0.01 to 0.10 inches in diameter and preferably in the range of 0.03 to 0.06 inches in diameter. Flow paths of larger dimensions can be used, however, if desired (especially for applications other than gas-assisted injection molding). Flow paths or passageways of less than 0.1 inch diameter will, however, at least retard the entry of molten plastic into the gas flow path 24 and valve chamber 32.

Referring now to FIGS. 3 and 4, the operation of the check valve of this invention will be explained. FIG. 3 shows the check valve in the closed position, whereby gas or molten plastic cannot flow in the direction of the arrow. The check valve assembly 16 is threadable engaged in the nozzle body 28 such that gas flow path 24 and the valve chamber 32 are in fluid communication. As is shown more clearly in FIG. 4, valve chamber 32 includes an upper portion and a tapered portion designed to receive the tapered valve member 34. Chamber 32 is defined and formed by fitting valve body 38 into nozzle body 28 as shown in FIGS. 3 and 4. In the closed position, tapered valve member 34 is seated in the tapered portion of valve chamber 32 such that gas flow path 24 is not in fluid communication with the gas supply passageway 30. In other words, when in the closed position, gas cannot flow through gas supply passageway 30, around tapered valve member 34 into the valve chamber 32, and into gas flow path 24. Such a flow is prevented by the close mating of the sealing surfaces 40 of the tapered valve member 34 with the sealing surfaces 42 of the tapered portion of the valve chamber 32. The sealing surfaces 40 and 42 are best known in FIG. 4. The sealing force is provided by pressure from the plastic flow path 22 acting upon the face 40 of the tapered valve member 34 thereby forcing the valve member 34 into the tapered portion of the valve chamber 32.

FIG. 4 shows the check valve in the open position, whereby gas can flow from the upstream end 56 to the downstream end 58 of the check valve assembly 16. The gas flows from the source of gas 13 (shown in FIG. 1) through gas supply passageway 30, through valve chamber 32 and around valve member 34, through slot 36, and through gas flow path 24. From gas flow path 24 the gas enters plastic flow path 22 as shown in FIG. 2.

As illustrated in FIGS. 3 and 4, the check valve of this present invention has one moving part, namely valve member 34 which moves from its sealed or closed position shown in FIG. 3 to its open position shown in FIG. 4. The check valve is essentially self-actuating. Gas pressure applied to the upstream end 56, if sufficient to overcome any back pressure exerted from the downstream end 58, forces the valve member 34 out of the tapered portion of the valve chamber 32, thereby breaking the seal between the sealing surfaces 40 of the valve member 34 and the sealing surfaces 42 of the valve chamber 32. The gas pressure applied to the upstream end 58 forces the face 46 against the nozzle side 45 of the valve chamber 32. Valve member 34, in moving from its closed to open position, moves a distance of "x" as shown in FIG. 4; this distance is simply the depth of the non-tapered portion of valve chamber 32. Normally, this depth "x" will be in the range of about 0.025 to 0.1 inches, although smaller or larger values are acceptable (especially in other applications). The depth "x" can easily be modified by simply increasing or reducing the length of the portion of valve body 38 threaded into nozzle body 28 (i.e., that portion of the valve body 38 from the end of the valve body containing the tapered portion to shoulder 44).

The slot or groove 36 in the face 46 of the valve member, which is clearly shown in FIG. 5, is designed to allow gas to pass from the valve chamber 32 into the gas flow path 24 in the nozzle body 28 when the valve member 34 is in the open position. Without this slot or equivalent gas passage, movement of the valve member 34 into its position in FIG. 4 would force the face 46 of the valve member against the nozzle body 28, thereby sealing off gas flow path 24 from the valve chamber 32. If desired, more than one slot or groove 36 can be provided in face 46.

Alternative means can be provided to allow gas to pass from the valve chamber 32 to the gas flow path 24 when the check valve is in the open position. For example, in FIGS. 6 and 7, a slot or groove 48 is provided in the nozzle body 28. In this alternative embodiment, the valve member 34 does not have a slot or groove in its large diameter end. Slot 48 in the nozzle body in FIGS. 6 and 7 performs the same function and purpose as does slot 36 in valve member 34 in FIG. 4. In this alternative embodiment, when in the open position, gas flows from the source of gas 13 (shown in FIG. 1) through gas supply passageway 30, through valve chamber 32 and around valve member 34, through slot 48, and through gas flow path 24. From gas flow path 24 the gas enters plastic flow pth 22 as shown in FIG. 2.

The valve member 34 has tapered sides 40 matched with the tapered sides 42 of valve chamber 32. Valve member 34, as illustrated in FIG. 5, is in the form of a solid cone with the vertex (or smaller diameter end) at the upstream end 56 of the check valve assembly 16 and the circular end 46 (or larger diameter end) at the downstream end 58 of the check valve assembly 16. A truncated cone with the same general shape would perform equally as well so long as there was sufficient sealing surfaces 40. Other similar cone-like shapes for the valve member 34 would work if there was sufficient sealing surfaces and the tapered poriton of the valve chamber 32 was modified accordingly. For example, the face 46 of the valve member could oval, triangular, square, rectangular, or the like with the tapered portion of the valve member 34 and the valve chamber 32 changed accordingly. Generally, however, it is preferred that the valve member 34 be in the form of a cone as illustrated in FIG. 5 or in the form of a truncated cone (not illustrated). With such cone-shaped and symmetrical (i.e., a circular face 40) valve members, sealing is not affected if the valve member should rotate about its major axis in the valve chamber.

The materials of construction for valve member 34 and valve body 38 are not critical so long as they can withstand the gas pressures involved and do not exhibit excessive wearing due to repetitive opening and closing. It is generally preferred, however, that when used in an injection molding environment, the valve member 34 be made from hardened stainless steel. Although not wishing to limit the invention, it is generally preferred that when used in an injection molding application that the valve member 34 be in the range of about 0.1 to 0.2 inches in diameter at the base with a diameter of about ⅛ inch being more preferred. The angle of the tapering per side of the valve member 34 and the valve chamber 32 should be in the range of 10° to 25° with an angle of about 15° being preferred. If the tapering angle is too large, there will be insufficient mating or sealing surfaces. And if the tapering angle is too small, the valve may tend to freeze in the closed position. With a base diameter of about ⅛ inch and a tapering angle of about 15°, the overall length of the valve member 34 illustrated in FIG. 5 would be about ½ inch. As one skilled in the art will recognize, these dimensions can vary widely from those presented here, especially for applications other then gas-or fluid-assisted injection molding, without departing from the scope of the inveniton.

FIG. 8 illustrates the use of the check valve of the present invention in a disk-shaped body 50 designed to be inserted between an injection molding nozzle of an injection molding machine (not shown) and a mold body (not shown). Such a disk-shaped body is designed to fit within the so-called sprue bushing (not shown) of a mold body. The nozzle mating surface 21 is designed to mate with the nozzle tip (not shown) of an associated thermoplastic injection nozzle (not shown). Molten thermoplastic from such an associated injection nozzle and machine passes into the disk-shaped body 50 via sprue 14 and then through plastic flow path 52. From plastic flow path 52 the molten thermoplastic enters an associated mold body (not shown). Gas can be injected into the plastic flow path 52 via gas flow path 54. Such gas enters the gas flow path 54 through check valve assembly 16. The check valve assembly 16 and its associated valve member 34 operate in the same manner as described above. The valve assembly 16 is shown entering the side of the disk-shaped body 50 in FIG. 8. If desired, the valve assembly could be moved to the circular face of the disk-shaped body which contains sprue 14. In such a case, care should be taken to assure that placement of the valve assembly does not interfere with mating between the disk-shaped body 50 and injection nozzle. In FIG. 8, gas flow path 54 and plastic flow path 52 form an acute angle. This angle (approximately 60°) is, however, some what larger than the similar angle defined in regard to FIG. 2 above. Nonetheless, gas entering plastic flow path 52 from gas flow path 54 will be traveling in essentially the same direction as the plastic in flow path 52.

Injection nozzles 10 or disk-shaped bodies 50 containing the check valves of the present invention can be used in a conventional manner to prepared molded plastic articles with gas-assisted injection molding apparatus. In such a procedure, molten thermoplastic material is injected into a mold cavity, followed by injection of a gas under pressure. The gas forces the thermoplastic material throughout the mold cavity to fill or pack out the extremities of the mold cavity while, at the same time, forming gas channels within the thermoplastic material. The thermoplastic material is allowed to cool while maintaining the gas pressure within the molded article. Once the molded article has cooled sufficiently to be self supporting, the gas is vented and the article is ejected using conventional methods. Preferably an inert gas, such as nitrogen, carbon dioxide, argon, and the like is used. Nitrogen is generally the most preferred pressurized gas.

That which is claimed is:

1. A nozzle for use in a fluid-assisted plastic injection molding apparatus, said nozzle including
   (a) a nozzle body having an upstream end for fluid communication with an end of an associated plastic injection molding machine and a downstream end for fluid communication with a sprue of an associated mold body, said nozzle body including
      (1) an axially extending first bore for establishing a plastic flow path,
      (2) a second bore extending through, and non-axially to, the nozzle body where a first end of the second bore is in fluid communication with a fluid supply and a second end of the second bore is in fluid communication with, and intersects, the axially extending first bore, and
      (3) a valve chamber provided in the second bore and in fluid communication with the second bore wherein the valve chamber is tapered and has a small diameter and a large diameter such that the small diameter of the valve chamber is adjacent to the first end of the second bore, the large diameter of the valve chamber is adjacent to the second end of the second bore, and the large diameter of the valve chamber is larger than the second bore diameter; and
   (b) a tapered valve member adapted to fit within the valve chamber and movable therein between a closed position and an open position, wherein
      (1) when the tapered valve member is in the closed position, the tapered surfaces of the valve member are sufficiently engaged with the tapered surfaces of the valve chamber to prevent fluid from passing from the second end of the second bore to the first end of the second bore, and
      (2) when the tapered valve member is in the opened position, the tapered surfaces of the valve member are displaced from the tapered surfaces of the valve chamber whereby fluid can pass from the first end of the second bore to the second end of the second bore.

2. A nozzle as defined in claim 1 wherein the tapered valve member is cone-shaped.

3. A nozzle as defined in claim 2 wherein the taper on the tapered valve member is in the range of 10° to 25°.

4. A nozzle as defined in claim 3 wherein the taper on the tapered valve member is about 15°.

5. A nozzle as defined in claim 3 wherein the tapered valve member is constructed of hardened stainless steel.

6. A nozzle as defined in claim 3 wherein the diameter of the base of the tapered valve member is in the range of 0.1 to 0.2 inches.

7. A nozzle as defined in claim 3 wherein the diameter of the base of the tapered valve member is about ⅛ inch.

8. A substantially disk-shaped body adapted for insertion between a molten thermoplastic injection nozzle and a mold body in a fluid-assisted plastic injection molding apparatus, said disk-shaped body including
  (a) a thermoplastic first passageway extending through the disk-shaped body wherein the thermoplastic first passageway has an upstream end for communication with the end of the injection molding nozzle and a downstream end for fluid communication with a sprue of the mold body;
  (b) a second passageway extending through the disk-shaped body where a first end of the second passageway is in fluid communication with a fluid supply and a second end of the second passageway is in fluid communication with, and intersects, the thermoplastic first passageway, and
  (c) a valve chamber provided in the second passageway and in fluid communication with the second passageway wherein the valve chamber is tapered and has a small diameter and a large diameter such that the small diameter of the valve chamber is adjacent to the first end of the second passageway, the large diameter of the valve chamber is adjacent to the second end of the second passageway, and the large diameter of the valve chamber is larger than the second passageway diameter; and
  (d) a tapered valve member adapted to fit within the valve chamber and movable therein between a closed position and an open position, wherein
    (1) when the tapered valve member is in the closed position, the tapered surfaces of the valve member are sufficiently engaged with the tapered surfaces of the valve chamber to prevent fluid from passing from the second end of the second passageway to the first end of the second passageway, and
    (2) when the tapered valve member is in the opened position, the tapered surfaces of the valve member are displaced from the tapered surfaces of the valve chamber whereby fluid can pass from the first end of the second passageway to the second end of the second passageway.

9. A substantially disk-shaped body as defined in claim 8 wherein the tapered valve member is cone-shaped.

10. A substantially disk-shaped body as defined in claim 9 wherein the taper on the tapered valve member is in the range of 10° to 25°.

11. A substantially disk-shaped body as defined in claim 10 wherein the taper on the tapered valve member is about 15°.

12. A substantially disk-shaped body as defined in claim 10 wherein the tapered valve member is constructed of hardened stainless steel.

13. A substantially disk-shaped body as defined in claim 10 wherein the diameter of the base of the tapered valve member is in the range of 0.1 to 0.2 inches.

14. A substantially disk-shaped body as defined in claim 13 wherein the diameter of the base of the tapered valve member is about ⅛ inch.

15. An apparatus for molding a plastic part, said apparatus including
  (a) a source of molten thermoplastic material;
  (b) a source of injection fluid;
  (c) a mold body for receiving the molten thermoplastic material from the molten thermoplastic material source, where the mold body contains a sprue;
  (d) an injection nozzle secured between the source of thermoplastic material and the mold body, where the injection nozzle includes
    (1) a nozzle body having an upstream end for fluid communication with the source of thermoplastic material and a downstream end for fluid communication with the sprue of the mold body, said nozzle body including
      (A) an axially extending first bore for establishing a thermoplastic flow path,
      (B) a second bore extending through, and nonaxially to, the nozzle body where a first end of the second bore is in fluid communication with the source of injection fluid and a second end of the second bore is in fluid communication with, and intersects, the axially extending first bore, and
      (C) a valve chamber provided in the second bore and in fluid communication with the second bore wherein the valve chamber is tapered and has a small diameter and a large diameter such that the small diameter of the valve chamber is adjacent to the first end of the second bore, the large diameter of the valve chamber is adjacent to the second end of the second bore, and the large diameter of the valve chamber is larger than the second bore diameter; and
    (2) a tapered valve member adapted to fit within the valve chamber and movable therein between a closed position and an open position, wherein
      (A) when the tapered valve member is in the closed position, the tapered surfaces of the valve member are sufficiently engaged with the tapered surfaces of the valve chamber to prevent fluid from passing from the second end of the second bore to the first end of the second bore, and
      (B) when the tapered valve member is in the opened position, the tapered surfaces of the valve member are displaced from the tapered surfaces of the valve chamber whereby fluid can pass from the first end of the second bore to the second end of the second bore.

16. An apparatus as defined in claim 15 wherein the tapered valve member is cone-shaped.

17. An apparatus as defined in claim 16 wherein the taper on the tapered valve member is in the range of 10° to 25°.

18. An apparatus as defined in claim 16 wherein the diameter of the base of the tapered valve member is in the range of 0.1 to 0.2 inches.

19. An apparatus as defined in claim 16 wherein the tapered valve member is constructed from hardened stainless steel, wherein the taper on the valve member is about 15°, and wherein the diameter of the base of the tapered valve member is about ⅛ inch.

20. An apparatus for molding a plastic part, said apparatus including
   (a) a source of molten thermoplastic material;
   (b) a source of injection fluid;
   (c) a mold body for receiving the molten thermoplastic material from the molten thermoplastic material source, where the mold body contains a sprue;
   (d) an injection nozzle having an upstream end and a downstream end in fluid communication with the thermoplastic material source; and
   (e) a substantially disk-shaped body secured between, and in fluid communication with, the downstream end of the injection nozzle and the sprue, where the disk-shaped body includes
      (1) a thermoplastic first passageway extending through the disk-shaped body wherein the thermoplastic first passageway has an upstream end for communication with the downstream end of the injection nozzle and a downstream end for fluid communication with the sprue of the mold body;
      (2) a second passageway extending through the disk-shaped body where a first end of the second passageway is in fluid communication with the source of injection fluid and a second end of the second passageway is in fluid communication with, and intersects, the thermoplastic first passageway, and
      (3) a valve chamber provided in the second passageway and in fluid communication with the second passageway wherein the valve chamber is tapered and has a small diameter and a large diameter such that the small diameter of the valve chamber is adjacent to the first end of the second passageway, the large diameter of the valve chamber is adjacent to the second end of the second passageway, and the large diameter of the valve chamber is larger than the second passageway diameter; and
      (4) a tapered valve member adapted to fit within the valve chamber and movable therein between a closed position and an open position, wherein
         (A) when the tapered valve member is in the closed position, the tapered surfaces of the valve member are sufficiently engaged with the tapered surfaces of the valve chamber to prevent fluid from passing from the second end of the second passageway to the first end of the second passageway, and
         (B) when the tapered valve member is in the opened position, the tapered surfaces of the valve member are displaced from the tapered surfaces of the valve chamber whereby fluid can pass from the first end of the second passageway to the second end of the second passageway.

21. An apparatus as defined in claim 20 wherein the tapered valve member is cone-shaped.

22. An apparatus as defined in claim 21 wherein the taper on the tapered valve member is in the range of 10° to 25°.

23. An apparatus as defined in claim 21 wherein the diameter of the base of the tapered valve member is in the range of 0.1 to 0.2 inches.

24. An apparatus as defined in claim 21 wherein the tapered valve member is constructed from hardened stainless steel, wherein the taper on the valve member is about 15°, and wherein the diameter of the base of the tapered valve member is about ⅛ inch.

* * * * *